Patented July 11, 1950

2,514,986

UNITED STATES PATENT OFFICE 2,514,986

FINISHING OF LIQUID POLYMERS

Fred W. Banes and Per K. Frolich, Westfield, N. J., assignors to Standard Oil Development Company, a corporation of Delaware No Drawing. Application October 15, 1946, Serial No. 703,291

6 Claims. (Cl. 260—666)

This invention pertains to the preparation of liquid products by the polmerization of conjugated diolefins or mixtures containing conjugated diolefins in aqueous emulsion and particularly to a method of clarifying and purifying such liquid products.

As described in U. S. Serial No. 637,782 filed December 28, 1945, by P. K. Frolich, B. M. Vanderbilt, and M. W. Swaney, now Patent No. 2,500,983, it has been found that liquid polymers can be prepared by the emulsion polymerization of conjugated diolefins such as butadiene, isoprene, piperylene, dimethyl butadiene, methyl pentadiene, or the like, and from mixtures of a major proportion of such conjugated diolefins and a minor proportion of an unsaturated comonomer such as styrene, alpha methyl styrene, alpha methyl para methyl styrene, halogenated styrenes such as chlorinated and brominated styrenes, acrylonitrile, methacrylonitrile, acrylic- and methacrylic acid esters such as methyl acrylate and methyl methacrylate, fumaric acid esters such as ethyl fumarate and unsaturated ketones such as methyl vinyl ketone and methyl isopropenyl ketone, by proper control of the reaction conditions. Specifically it was found that liquid polymers were obtained by using relatively high concentrations (i. e., at least 3 wt. per cent based on the monomers) of an aliphatic mercaptan polymerization modifier and/or using a highly unsaturated fatty acid for preparing the soap emulsifier. Aliphatic mercaptan polymerization modifier of combined chain length of at least 5 carbon atoms may be used, the amount of modifier varying between 3% and 10–12%, based on the monomers, depending upon the specific mercaptan employed and the particular type of polymeric oil sought. Tertiary mercaptans are preferred to the primary or secondary mercaptans, but all three types may be advantageously employed. For a typical reaction, about 3–8% of the tertiary mercaptan derived from the dimer of isobutylene, or about 5–10% of the tertiary mercaptans derived from the trimer of isobutylene, or in still another case, about 7–12% of the tertiary mercaptans derived from the tetramer of isobutylene may be used. It is preferred not to use mercaptans containing more than 16 carbon atoms and these should ordinarily be of the tertiary type. In the case of primary mercaptans, it is ordinarily preferred to use compounds containing not more than 12 carbon atoms per molecule. The preferred mercaptan is the tertiary mercaptan prepared from diisobutylene (isobutylene dimer). The mercaptan modifying agent may be replaced at least in part with other modifying agents such as alkyl xanthogen polysulfides, although these reagents are less desirable than mercaptans because of their retarding effect upon the reaction rate. The modifier may be added to the reaction mixture at the start of the reaction or only a part of the modifier may be added initially and the remainder may be added portionwise during the reaction. Portionwise addition of the modifier is especially desirable when the polymerization reaction is carried substantially to completion or 100% monomer conversion.

Fatty acids which may be used in the preparation of soap emulsifiers are preferably those derived from drying oils such as linseed oil or soybean oil although other acids such as oleic, myristic, stearic or abietic acids may also be used. By using soaps of highly unsaturated fatty acids as emulsifiers, it is possible to reduce the amount of mercaptan or other polymerization modifier. The amount of emulsifier is about 0.25 to about 5 wt. per cent and the amount of polymerization catalyst is about 0.1 to about 1 wt. per cent based upon the monomers. The reaction is carried out at temperatures above about 30° C. and preferably at temperatures that are somewhat higher than are used in the production of solid rubbery polymers by emulsion polymerization. The polymer is recovered by breaking the resultant latex with a sodium chloride brine, by means of brine and an acid such as acetic or sulfuric acids, by means of an alkaline earth metal salt or other salt which converts the soap into a water-insoluble form, thereby permitting its separation from the oily polymer or the latex may be broken by means of a water-soluble organic liquid such as isopropyl alcohol and the like. The coagulate is washed several times with water or dilute alkali and then dried. The resultant products are liquid polymeric oils, free from rubbery products, even when the reaction is carried to 80–90% monomer conversion and said oils have an intrinsic viscosity of between 0.05 and 0.4. The oily liquid polybutadiene products ordinarily have an intrinsic viscosity of between 0.1 and 0.2 while the oily liquid copolymers of butadiene and styrene prepared by this technique have an intrinsic viscosity of between 0.2 and 0.4.

It has been found that low molecular weight polymer oils prepared in the foregoing way have shown certain undesirable properties. The oils, for example, have been found to be quite cloudy and rather dark in color and of rather widely varying drying properties.

It is the object of this invention to prepare polymer oils of good color, clarity and uniform drying properties.

It is also the object of this invention to prepare polymer oils of such color, clarity and drying properties as to be suitable for use as a drying oil.

These and other objects will appear more clearly from the detailed description and claims which follow.

We have now found that polymer oils of improved clarity, color and drying properties are obtained by creaming the polymer latex with brine, coagulating with an alcohol such as isopropyl alcohol or gaseous or solid $CO_2$ or a combination of alcohol and $CO_2$, reslurrying the coagulate several times with water and two or three times with dilute alkali, finally reslurrying with alcohol, separating the coagulate from the alcohol, dissolving the coagulate in a low boiling solvent which has a substantial solvent power for the polymer oil but substantially no solvent power for soap and gelled or cross-linked polymer, filtering the resultant solution and subjecting the filtrate to vacuum drying to remove the solvent and any residue of alcohol or water that may remain in the polymer oil. The oils obtained in this way possess good color due to the low temperature used for the only polymer drying step, and the resultant oils are very clear due to substantially complete absence of soap residues and also gelled or cross-linked polymer. The polymer oils thus treated have the further advantage that they air dry readily.

The polymers are ordinarily prepared from the following recipe:

| | Parts |
|---|---|
| Butadiene (or hydrocarbon monomer mixture) | 100 |
| Soap | 3 |
| Potassium persulfate | 0.3 |
| Potassium ferricyanide | 0.15 |
| Diisobutylene mercaptan | 5.0 |
| Water | 180 |

In the preparation of diolefin-nitrile copolymers, morpholine is used as the activator instead of potassium ferricyanide.

The amount of soap used as emulsifier is preferably the smallest amount that will give a stable emulsion. It is also preferred both from the standpoint of product quality and convenience of carrying out the reaction to effect a secondary activation in addition to the persulfate, i. e., by the addition of potassium ferricyanide in the case of hydrocarbon polymers such as polybutadiene or butadiene-styrene copolymers or with morpholine in the case of butadiene-acrylonitrile copolymers. Tertiary octyl mercaptan (diisobutylene mercaptan) is the most satisfactory polymerization modifier since lower molecular weight mercaptans show little promotion of the polymerization while higher molecular weight mercaptans than $C_8$ show better promotion, but inferior modifying properties. Polymers of uniform molecular weights throughout the polymerization are obtained by adding 3 parts of mercaptan initially, one part at 35% and another part at 55% conversion.

The polymerization is ordinarily carried to not more than about 70% conversion, since above this point the intrinsic viscosity of the polymer increases rapidly unless incremental addition of the mercaptan is resorted to. This conversion can ordinarily be obtained in from 8 to 10 hours at temperatures of 40–45° C. depending upon the amount of activator used.

It is ordinarily preferred to add a suitable antioxidant such as hydroxylamine or hydroxylamine hydrochloride ditertiary butyl cresol and the like in order to prevent further polymerization. Unreacted monomers may be removed from the product by the usual methods employed in the stripping of synthetic rubber latices as by flashing off at atmospheric or sub-atmospheric pressure with or without the help of an inert stripping agent such as steam, nitrogen or the like. If desired, unreacted mercaptan can be removed from the product by subjecting it to steam stripping at reduced pressures.

The latices may be coagulated by the addition thereto of about 0.7 part of brine (by volume) for each part (by volume) of latex, preferably together with sufficient carbon dioxide to adjust the coagulate particle size so that coalescence of fine particles occurs. In order to avoid redispersion of the coagulate during the first water slurry, it is necessary to add at least one part of isopropyl alcohol to each 20 parts of latex during coagulation. The final coagulate is in the form of a semi-fluid mass and the aqueous liquor is drained from this coagulate.

To further insure against redispersion of the low molecular weight polymers, it has been found advisable to use a 5.0% solution of isopropyl alcohol in water for the first slurry wash. The coagulate is reslurried several times with water and at least once and preferably two or three times with dilute alkali to remove soap and brine followed by at least one water wash. The coagulate is finally reslurried with isopropyl alcohol to remove any residual unreacted mercaptan whereupon as much of the alcohol as possible is removed from the coagulate by decantation. Instead of reslurry washings as described, the washing may be effected by dissolving the polymer oil in a water-insoluble solvent and applying countercurrent water and alkali washings.

In order to purify the polymer and render it substantially free of soap and gelled polymer, and to improve their drying properties, the coagulate is dissolved in from an equal volume to several volumes of a suitable solvent. Hydrocarbon-soluble coagulates are dissolved in pentane or a catalytically cracked $C_5$ cut boiling within the range of 90–102° F., which is free from heavy ends. If it is desired to avoid freezing of the filter bed in vacuum filtering of the solution or evaporation losses encountered with such highly volatile solvents, it is possible to utilize a higher boiling cut such as a process naphtha of 200–240° F. boiling range. This solvent also should be free from high boiling or heavy ends. Higher boiling solvents are not desirable inasmuch as the temperatures necessary to remove them from the polymer oils, is so high that the oil becomes badly discolored. Since drying temperature must be sufficiently high to drive off water, the solvent used may have a boiling point up to about 240–250° F. without causing undue discoloration. In the case of hydrocarbon insoluble polymers such as diolefin-nitrile copolymers and the like, the solvent may be acetone, methyl ethyl ketone, or other low boiling ketone.

The solution of polymer oil is then subjected to a filtering operation in order to remove insoluble materials and improve the clarity of the oil. Filtering can be effected by passing solutions of the polymer oil through a filter aid such as "Hy-Flo Super Gel" (Johns Manville) clay. Solutions of 25–30% polymer oil in pentane or other low boiling solvent can be clarified by a single pass through about a one-half inch bed of this filter aid. Other filter aids which may be used include Attapulgus clay, bentonite clay, Super Filtrol, (diatomaceous earths), asbestos, animal charcoal, etc. Either pressure, vacuum or gravitation methods of filtration may be employed. Instead of filtering the polymer oil solutions in order to effect clarification thereof, they may also be centrifuged to give clear oils in either batch or continuous processes. The addition of small amounts of such materials as "Hy-Flo" to the solutions prior to centrifuging seems to have certain advantages but is not essential.

The filtrate or the clarified solution obtained on centrifuging is then subjected to a vacuum drying operation. Solvent is flashed off, vacuum and heat applied to the polymer solutions. The polymer oil was heated to about 160–180° F. and vacuum of about 22 to 26 inches of mercury were applied, to give system pressures well below the vapor pressure of water at the operating temperatures. With higher boiling solvents such as that of 200–240° F. boiling range, the temperature and/or the vacuum may be increased to give system pressures below the vapor pressure of the highest boiling solvent at the operating temperature.

The resultant polymer oils are of excellent color and clarity and may be readily dried in air. They may, accordingly, be used as drying oils in paints and other coating compositions. Materials such as cloth, leather and paper may be rendered resistant to the effects of agents such as water, organic solvents and grease by surface coating or impregnating these materials with these polymeric oils. Following impregnation or coating, the articles are either dried in air or baked to dryness. In either case driers such as are in common use as accelerators for drying oils can be used to shorten the drying times. The final articles are not discolored and retain all of their original flexibility. Since these polybutadiene polymer oils possess unsaturation of the type and in the amounts found in rubber, they may be vulcanized by methods in common use for polymers of high unsaturation to give flexible and resistant coatings.

The following examples are illustrative of the present invention.

*Example 1*

A polymerization was carried out using the initial charge:

| | Parts |
|---|---|
| Butadiene | 100.0 |
| Soap (sodium salt of tallow acids) | 4.0 |
| Water | 180.0 |
| Potassium persulfate | 0.3 |
| Potassium ferricyanide | 0.15 |
| Di-isobutylene mercaptan | 3.0 |

At monomer conversions of approximately 25 and 50%, an additional part of mercaptan was added, making a total of 5.0 parts on the butadiene.

After 7.0 hours reaction time at 45° C., 70% of the monomer had been converted to polymer and the reaction mixture was dumped, the latex short-stopped with 0.1% hydroxylamine, and unreacted butadiene stripped from the latex.

The homogeneity of the polymer produced is illustrated by the following intrinsic viscosity data:

| Per Cent Conversion | Int. Vis. |
|---|---|
| 38.3 | 0.116 |
| 46.3 | 0.112 |
| 54.0 | 0.112 |
| 70.0 | 0.121 |

The stabilized latex was coagulated with 0.7 volume of brine, and 0.05 volume of isopropyl alcohol per volume of latex. This coagulate was washed four times by slurrying in warm distilled water. The coagulate was then given a final alcohol wash and dried by heating at atmospheric pressure at temperatures not exceeding 130° C.

The final polymer was very cloudy in appearance. A sample of this product was dissolved in n-pentane to give a solution of about 30% concentration. The solution was filtered through a bed of Hy-Flo filter aid and the pentane then was stripped from the filtrate by heating under vacuum. The residue filtered from the solution was recovered and dried.

Analyses and observations concerning the original polymer and the two fractions obtained therefrom are listed below:

| Polymer | Appearance | Per Cent Soap | Per Cent Fatty Acid |
|---|---|---|---|
| Original | Cloudy, turbid | 1.04 | 0.30 |
| Filtered Polymer | Clear, light colored, fluid. | 0.15 | 0.22 |
| Residue from Filtration. | Turbid, very viscous | 18.82 | 2.03 |

These data show that the purification procedure employed has not only clarified the oil but has also purified it of soap contaminants.

*Example 2*

A liquid polymer of butadiene was prepared in accordance with the recipe given in Example 1. A conversion of 72.5% was obtained after 7 hours polymerization at 45° C. The latex was short-stopped with 0.1% hydroxylamine and coagulated with brine and alcohol. This coagulate was washed once with water to remove any traces of brine occluded in the coagulate. The coagulate was then divided into two parts (A) and (C). Part A was dried at 125° C. to give a dark colored viscous polymer. Part of this material (hereafter referred to as Part (B)) was dissolved in pentane, filtered through Hy-Flo filter aid and then dried under vacuum. The polymer which was isolated was clear but dark colored.

Part C (original coagulate) was dissolved in pentane and filtered through Hy-Flo filter aid. A layer of water was removed from the filtrate and the remaining pentane solution was then heated under vacuum until the solvent had been completely removed. The final polymer in this case was clear and light colored. Data obtained on these three oils are summarized below:

| Polymer | Percent Soap | Appearance | Drying Properties |
|---|---|---|---|
| Part A | 3.17 | Dark-Cloudy | Did not dry. |
| Part B | 0.63 | Dark-Clear | Dried in 6 days. |
| Part C | 0.62 | Light-Clear | Dried in 3 days. |

These data again illustrate the advantages in oil appearance and purity gained by use of pentane solutions and filtrations.

*Example 3*

A polybutadiene oil was prepared in accordance with the recipe given in Example 1 in pilot plant equipment using a 110# butadiene charge. A conversion of 69% was obtained after 8 hours polymerization at 113° F. and the run was terminated at this conversion. The latex was short-stopped with 0.1% hydroxylamine and then coagulated with brine and carbon dioxide. The coagulate was washed with water and caustic solutions by reslurrying in an open vat.

A sample of the washed polymer was withdrawn at this point and split into two parts (A and B). Part A was dried by heating at 125° C. while Part B was dissolved in pentane, filtered and then dried in a manner already described. The following data indicate the advantages of dissolution and filtration.

| Polymer | Intrinsic Viscosity | Appearance | Percent Soap |
|---|---|---|---|
| Part A | 0.107 | Cloudy-dark colored | 1.73 |
| Part B | 0.105 | Clear-Light colored | 0.04 |

*Example 4*

An oily copolymer of butadiene and acrylonitrile was prepared by using the charge

| | Parts |
|---|---|
| Butadiene | 74.0 |
| Acrylonitrile | 26.0 |
| Selectively hydrogenated tallow acids | 3.58 |
| NaOH (85% fatty acid neutralization) | 0.455 |
| Potassium persulfate | 0.3 |
| Morpholine | 0.15 |
| Di-isobutylene mercaptan | 6.0 |
| Water | 180.0 |

The polymerization was carried out at 35° C. and required 10 hours to reach a conversion of 70%. One-half of the mercaptan was added to the charge initially and ¼ was added at 25 and at 50% conversion.

The latex was short-stopped with 0.1% hydroxylamine and coagulated with brine and alcohol. The coagulate was washed once with 0.25% sodium hydroxide solution, and three times with water. The washed coagulate was then dried at temperatures not exceeding 140° C. This polymer was quite cloudy but when it was dissolved in acetone and filtered through a bed of Hy-Flo, a clear filtrate was obtained. This filtrate yielded a clear, fluid polymer. Analysis of this polymer gave the following results:

| | |
|---|---|
| Intrinsic viscosity | 0.12 |
| Percent nitrogen | 6.66 |
| Percent soap | 0.12 |
| Percent fatty acid | 0.23 |

The foregoing description contains a limited number of embodiments of the present invention. It will be understood, however, that the invention is not limited to the specific conditions disclosed since numerous variations are possible without departing from the scope of the following claims.

What we claim and desire to secure by Letters Patent is:

1. In the process of purifying polymeric drying oil obtained by polymerizing butadiene-1,3 in aqueous emulsion in the presence of 0.25 to 5.0 weight percent based on monomers of a sodium soap of a fatty acid and in the presence of 3 to 8 weight per cent based on the monomers of an aliphatic mercaptan of from 8 to 16 carbon atoms, coagulating the resultant emulsion of polymer in reaction medium, separating the polymer oil coagulum, and washing the coagulum with water, alkali and alcohol, the steps of dissolving the polymer oil coagulum in normal pentane, filtering the resultant solution through a clay filter aid and evaporating the solvent from the filtrate.

2. In the process of purifying a polymeric drying oil obtained by polymerizing a conjugated diolefin of 4 to 6 carbon atoms in aqueous emulsion in the presence of 3 to 12 weight percent based on monomers of an aliphatic mercaptan having 5 to 16 carbon atoms and 0.25 to 5.0 weight percent based on monomers of an emulsifier, coagulating the resulting emulsion of oily polymer, separating the coagulated oily polymer and washing the separated polymer with water, the improvement which comprises dissolving the oily polymer in a hydrocarbon solvent having a boiling range between 90 and 250° F., and filtering the resulting solution.

3. In the process of purifying a polymeric drying oil having an intrinsic viscosity between 0.05 and 0.4 and obtained by polymerizing butadiene-1,3 in aqueous emulsion in the presence of 0.25 to 5.0 weight percent based on monomers of a fatty acid soap emulsifier and 3 to 8 weight percent based on monomers of a tertiary aliphatic mercaptan having from 8 to 16 carbon atoms, coagulating the resulting aqueous emulsion of oily polymer, separating the oily polymer from the coagulated emulsion and washing the separated polymer with water, alkali, and alcohol, the improvement which comprises dissolving the washed oily polymer in a hydrocarbon solvent having a boiling range between 90 and 120° F., filtering the resulting solution to separate soap and insoluble gel polymer therefrom and evaporating the solvent from the filtrate.

4. In the process of purifying a polymeric drying oil having an intrinsic viscosity between 0.1 and 0.4 and obtained by polymerizing butadiene-1,3 in aqueous emulsion in the presence of 0.25 to 5.0 weight percent based on monomers of an emulsifier consisting of a sodium salt of tallow acid and in the presence of 3 to 8 weight percent based on monomers of diisobutylene mercaptan, adding brine and isopropyl alcohol to the resulting aqueous emulsion of oily polymer and thereby breaking the emulsion, separating the oily polymer from the aqueous portion of the broken emulsion and washing the separated oily polymer with water, alkali, and isopropyl alcohol, the improvement which comprises dissolving the oily polymer in such an amount of normal pentane that a solution containing 25 to 30% of polymers is formed, filtering the resulting solution through a bed of clay filter aid and evaporating the pentane at a temperature between 160 and 180° F. under a vacuum of 22 to 26 inches of mercury, 5. A process according to claim 4 wherein the polymeric drying oil is obtained by copolymerizing a major proportion of butadiene-1,3 and a minor proportion of styrene.

6. A process according to claim 4 wherein the polymeric drying oil is obtained by copolymerizing a major proportion of butadiene-1,3 and a minor proportion of acrylonitrile and wherein the oil is dissolved in acetone prior to filtration.

FRED W. BANES.
PER K. FROLICH.

REFERENCES CITED

The following references are of record in the file of this patent:

UNITED STATES PATENTS

| Number | Name | Date |
|---|---|---|
| 1,254,866 | Thiele | Jan. 29, 1918 |
| 2,067,854 | Macdonald | Jan. 12, 1937 |
| 2,099,513 | De Simo | Nov. 16, 1937 |
| 2,142,592 | Waligora | Jan. 3, 1939 |
| 2,252,333 | Rothrock | Aug. 12, 1941 |
| 2,255,729 | Britton | Sept. 9, 1941 |

FOREIGN PATENTS

| Number | Country | Date |
|---|---|---|
| 18,506 | Great Britain | 1912 |

OTHER REFERENCES

Snyder et al.: Jour. Am. Chem. Soc., vol. 68, 1422–1431 (1946).